(12) United States Patent
Faraldo, II (10) Patent No.: US 6,950,868 B1
(45) Date of Patent: Sep. 27, 2005

(54) METHOD OF AND APPARATUS FOR REMOTE MONITORING

(75) Inventor: David D. Faraldo, II, Foster City, CA (US)

(73) Assignee: Red Hat, Inc., Raleigh, NC (US)

( * ) Notice: Subject to any disclaimer, the term of this patent is extended or adjusted under 35 U.S.C. 154(b) by 658 days.

(21) Appl. No.: 09/703,437

(22) Filed: Oct. 31, 2000

(51) Int. Cl.⁷ ............................................ G06F 15/173
(52) U.S. Cl. ...................... 709/224; 709/223
(58) Field of Search ............................. 709/223, 224, 709/232, 234; 714/47; 713/201

(56) References Cited

U.S. PATENT DOCUMENTS

| | | | |
|---|---|---|---|
| 5,748,884 A | 5/1998 | Royce et al. | |
| 5,754,111 A | 5/1998 | Garcia | |
| 5,870,559 A | 2/1999 | Leshem et al. | |
| 5,949,976 A * | 9/1999 | Chappelle | 709/224 |
| 5,958,008 A | 9/1999 | Pogrebisky et al. | 709/223 |
| 6,003,143 A | 12/1999 | Kim et al. | 714/38 |
| 6,006,260 A | 12/1999 | Barrick, Jr. et al. | |
| 6,012,087 A | 1/2000 | Freivald et al. | 709/218 |
| 6,064,653 A | 5/2000 | Farris | |
| 6,138,157 A * | 10/2000 | Welter et al. | 709/224 |
| 6,157,618 A * | 12/2000 | Boss et al. | 370/252 |
| 6,175,869 B1 * | 1/2001 | Ahuja et al. | 709/226 |
| 6,519,714 B1 * | 2/2003 | Sweet et al. | 714/28 |
| 6,564,342 B2 * | 5/2003 | Landan | 714/48 |
| 6,567,937 B1 | 5/2003 | Flores et al. | |
| 2001/0052087 A1 * | 12/2001 | Garg et al. | 714/37 |
| 2001/0056483 A1 * | 12/2001 | Davis et al. | 709/224 |
| 2002/0052947 A1 * | 5/2002 | Dulmovich et al. | 709/224 |
| 2002/0116491 A1 * | 8/2002 | Boyd et al. | 709/224 |

FOREIGN PATENT DOCUMENTS

| | | | | |
|---|---|---|---|---|
| WO | 0022534 | 4/2000 | ............ | G06F 13/00 |
| WO | WO 00 19320 | 4/2000 | | |
| WO | WO 0019320 A1 * | 4/2000 | ............ | G06F 11/34 |

OTHER PUBLICATIONS

Preston Gralla, How the Internet Works, 1997, Que Publishing, Special Edition, p. 12.*

Rinelli, P.; International Search Report, International Application No. PCT/US 01/46117; May 26, 2003.*

NetSaint web Homepage at www.netsaint.org, Sep. 24, 2000, 3 pages.

*TELALERT* Datasheet, Telamon, Inc., Oakland, CA, Jun. 16, 1999, 2 pages.

G. Trent and M. Sake, "WebStone: The First Generation in HTTP Server Benchmarking," printed from website at: http://www.mindcraft.com/webstone/paper.html. Feb. 1995, 11 pages.

Almeida, Jussara, et al., "Measuring the Behavior of a World-Wide Web Server," in: Seventh Conference on High Performance Networking (HPN). Apr. 1997. pp. 57-72.

Senna, Jeff, "PageSentry keeps tabs on Internet servers," InfoWorld, Jun. 30, 1997, vol. 19, Issue 26, p. 82B.

(Continued)

*Primary Examiner*—Frantz B. Jean
(74) *Attorney, Agent, or Firm*—Blakely, Sokoloff, Taylor & Zafman LLP (57) ABSTRACT

A method and apparatus is described for remote monitoring of a business site network. One or more remote satellite systems may be strategically positioned at different points on the Internet that are close to backbone networks in order to monitor and evaluate typical user interactions with a business site. By positioning the remote satellite systems at points near backbones approximate to those of users accessing a business site, a more accurate analysis of a site's performance may be performed that better reflects the experience that similarly connected users experience. Various network and system parameters of a business site may be monitored, such as threshold timing parameters and correctness parameters.

21 Claims, 10 Drawing Sheets

OTHER PUBLICATIONS

Davis, Beth, "Web Services Help Measure Site Success," Communications Week, Sep. 30, 1996, Issue 631, 2 pages.

NFR® Intrusion Detection Appliance User's Guide, Version 5.0, Network Flight Recorder, Inc., Oct. 2000.

Ranum, Marcus J., et al., "Implementing a Generalized Tool for Network Monitoring," 1997 LISA XI Conference, Oct. 26-31, 1997—San Diego, CA, pp. 1-8.

LaLiberte, & Braverman, "A Protocol for Scalable Group and PublicAnnotations," from website www.igd.fhg.de/archive/1995_www95/proceedings/papers/100/scalable-annotations.html, 10 pgs.

Marc Abrams & Stephen Williams, "Complementing Surveying and Demographics with Automated Network Monitoring," Jun. 17, 1996, http://vtopus.cs.vt.edu/~chitra/docs/9623j/96w3j.html, 22 pages.

Monk, Tracie, et al., "Internet Data Acquisition & Analysis: Status & Next Steps," from website: www.caida.org/outreach/papers/data-inet97.html, Mar. 21, 1997, 16 pages.

Sedayao, Jeffrey, C. IPPM Mail Archives: draft of end to end metrics (ICMP, HTTP) document, from website: http://www.advanced.org/IPPM/archive.1/0226.html, Nov. 26, 1996, 14 pages.

Cottrell, L. & Logg, C., "Network Monitoring for the LAN and WAN," Talk given an ORNL, Jun. 25, 1996, from website: www.slac.stanford.edu/grp/scs/net/talk/ornl-96/ornl.htm, 16 pages.

Installation and Configuration Manual for Big Brother Systems and Network Monitors, Ver. 1.6b, Jan. 3, 2001 and READ. ME .CHANGES file to versions since Beta 0.91, Nov. 18, 1996, printed from website:http://bb4.com; 34 pages and 12 pages respectively.

Fielding, Roy T., "Maintaining Distributed Hypertext Infostructures: Welcome to MOMspider's Web.," Paper presented at WWW94, Geneva, Switzerland, May 25-27, 1994, printed from website: www.ics.uci.edu/pub/websoft/MOMspider/WWW94/paper.html; 24 pages.

Almeida, JM; Almeida, V; and Yates, D. "WebMonitor: a Tool for Measuring World-Wide Web Server Performance," Apr. 1997, printed from website: www.firstmonday.dk/issues/issues2_7/almeida/; 24 pages.

TelAlert UMS 5.2 Quick Start Guide, 2000, Telamon, Inc., TA-TD-002-3, 32 pages.

Jeffrey A. Fox et al., "Web-Based Automated Reporting: Saving Time, Money, and Trees", 2$^{nd}$ International Symposium on Spacecraft Ground Control and Data Systems, Feb. 1999, XP002227342 Foz de Iguacu, Brasil.

International Search Report, International application no. PCT/US 01/46117, International Filing date Oct. 18, 2001.

"Communication pursuant to Article 96(2) EPC", European Patent Office, Applicant Nocpulse, Inc., Application No. 01-992 938.9-1225, Jun. 3, 2004 (8 pages).

PCT International Search Report, International Application No. PCT/US01/46117, International Filing Date Oct. 18, 2001, mailed Jun. 11, 2003.

* cited by examiner

URL

761 {
- Protocol: http: ▼  host: [ ] ? port: [ ]
- Path: /
- Method: ● GET
  ○ POST content: [ ]

Features:

Subsidiary pages? ○ yes ● no   Link verification? ○ yes ● no  } 765
Content check [ ]

764 { Notifications:
on recovery? ○ yes ● no   when critical? ○ yes ● no   on warning? ○ yes ● no

Thresholds

763 {
- Total time: critical (s): [ ]   warning (s): [ ]
- Latency: critical (s): [ ]   warning (s): [ ]
- Connect time: critical (s): [ ]   warning (s): [ ]
- DNS: critical (s): [ ]   warning (s): [ ]
- Throughput: critical (bps): [ ]   warning (bps): [ ]
- Trans: critical (bps): [ ]   warning (bps): [ ]

764 { Contact:
| All contacts | | Selected contacts |
| Steve_pager  | Add | Tom_pager |
| Joe_pager    | Remove | |
| DBA_group    | | |
| Tom_email    | | |
| Manager_email| | |
| Steve_methods| | |

Advanced Options:

762 — Authentication: username: [ ]   password: [ ]

767 { Set cookie:
- key [ ]   value: [ ]
- path [ ]   domain: [ ]
- Cookie port [ ]   Secure? ○ yes ● no

METHOD OF AND APPARATUS FOR REMOTE MONITORING

FIELD OF THE INVENTION

This invention relates to the field of network systems and, in particular, to remote monitoring of a computer system on a network.

BACKGROUND

Figure 1:
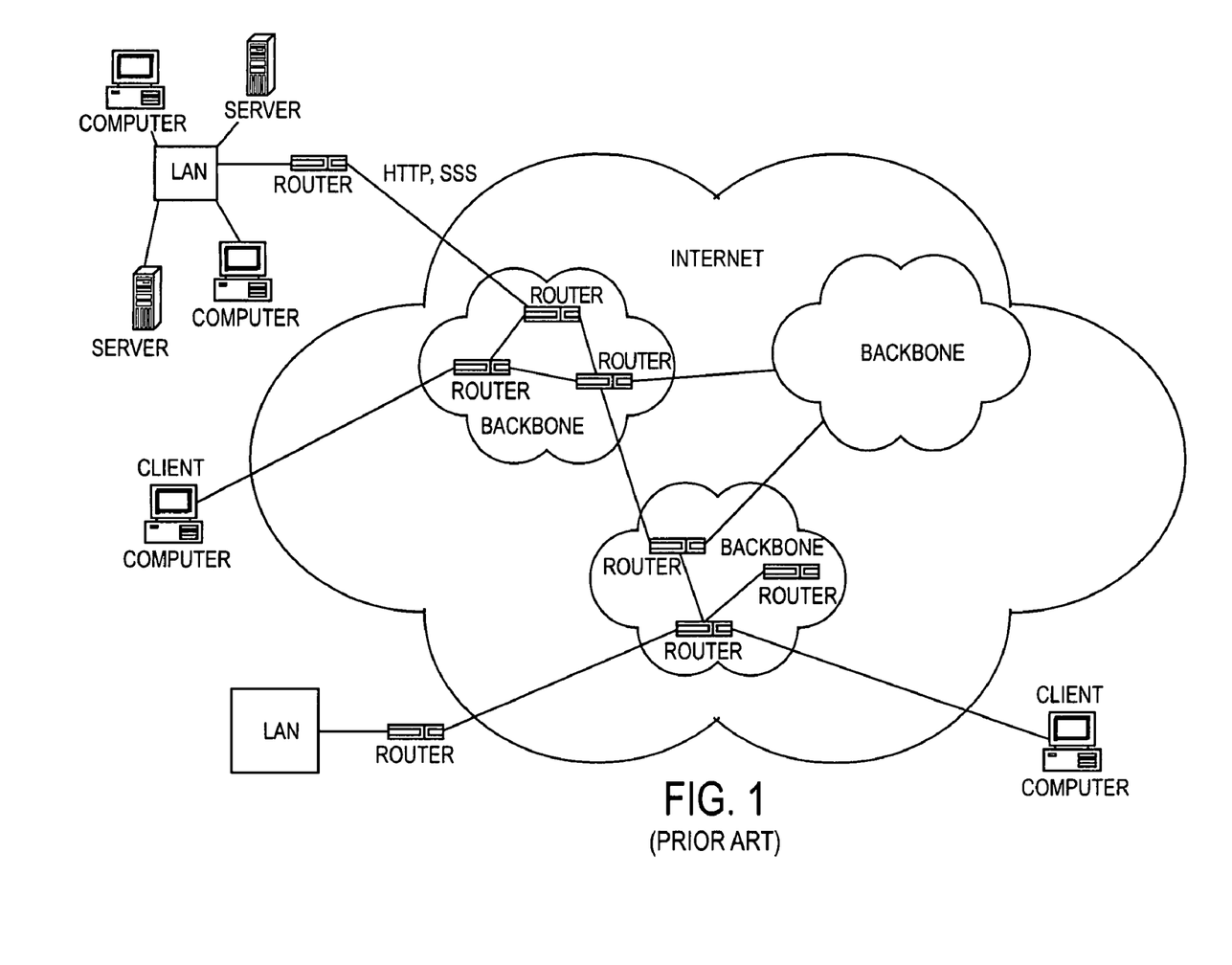
FIG. 1 illustrates an internetwork architecture.

The Internet may be described in a simplified manner as a collection of computer systems (e.g., clients and servers) that are interconnected by public/private networks (e.g., transmission lines and routers) to enable the transfer of information among them, as illustrated in FIG. 1. These computer systems are often modeled by their function: client-server. In the client-server model, communication generally takes the form of a request from the client to the server asking for an operation to be performed (e.g., request for data). The server performs the work and sends a reply. A client may then retrieve and display the requested information. However, a computer system may operate as both a server and a client.

Client-server systems communicate with each other using a variety of network protocols, such as Transmission Control Protocol/Internet Protocol (TCP/IP) and Integrated Packet Exchange (IPX), and a variety of application protocols, such as HyperText Transfer Protocol (HTTP) and File Transfer Protocol (FTP). A user typically views the Internet as a collection of web pages that are typically located on a server at a network site. Each web page may contain text, embedded components such as graphic image files, and address links to other pages referred to as a Uniform Resource Locator (URL). Web pages are viewed using a program called a browser that resides on a user's client computer. The browser retrieves information from a requested page on a server, interprets the data and formatting commands, and displays the text and special accessory files, such as images, on the user's client system.

Increased traffic on the Internet has resulted in performance problems with sites (systems and connections), such as reduced download speeds during periods of heavy loads (a measure of system activity). Businesses are faced with the increasing burden of monitoring and testing the performance of their sites on a real-time basis. For example, a business may rely on its on-line site to sell a product. If the business site, or a portion thereof (e.g., a web page or server), is not operating properly, orders for a product may not be able to be placed. This may result in a business suffering financial consequences. As such, a business has an interest to know if and when any portion of its site ceases to operate properly from its customer's point of view.

The performance of a site and its computer systems may be measured in different ways. One measure of performance is the accessibility of the computer system through a backbone used to connect the computer system with an end user. A backbone, also referred to as an Autonomous System (AS) network, is a set of transmission lines and hardware that a business site may be connected to for long distance communication. Another measure of performance is the amount of time it takes to retrieve and display the information to the user, referred to as download speed.

One way to monitor and analyze a business site's performance is to measure performance on the server side (the computer system providing the pages requested by the user). One problem with such a method is that the performance experienced by a user may not be readily determined from measurements made from the server. For example, the speed with which a server delivers requested information may not correlate with the speed experienced on the client side by a user due to, for example, congested or downed transmission lines.

Another way to monitor and analyze a site's performance is to perform client side measurements using an actual user's client system. For example, a user's client browser may be configured to record download speeds of particular transactions. Such performance information is stored on a client's system and then obtained from the user's system. One problem with such a method is that the performance information collected is based on user specific factors that may be uncontrollable and may not be common to other users. For example, a user running several simultaneous, high bandwidth downloads will typically experience slower performance than a user on an identical client system with an identical browser who is running a single low bandwidth download.

Another problem with client side measurements is that the collected performance information may be limited to only measuring the total load time of a web page and throughput (bytes of data sent over an end-to-end transaction time). The condition of the network connection to the client may not be included in the collected information. As such, allowances for these other factors may not be made when analyzing performance.

Moreover, strictly load time and throughput measurements do not reflect the quality of the downloaded information. For example, if a server is non-operational, then requests to a web page on the server may return an error message response (e.g., "can't process request") very quickly. This would appear to be a period of exceptionally good download performance when, in fact, no content from the site was downloaded to the user. Therefore, such a method may not provide an accurate or detailed analysis of a site's performance that reflects a customer's true experience.

Furthermore, prior methods of web site analysis use browsers that are very code intensive and operating systems that may not be very reliable. Such platforms may not be very scalable or robust and, thus, may not be desirable.

SUMMARY OF THE INVENTION

The present invention pertains to a method of and apparatus for remote monitoring. In one embodiment, the apparatus may includes an intranetwork, an extranetwork coupled to the intranetwork, and a first host digital processing system coupled to the intranetwork with the first digital processing system has performance parameters. The first remote digital processing system may be coupled to the extranetwork to monitor a performance parameter of the first host digital processing system.

In one embodiment, the method may include positioning a remote digital processing system on a backbone network remotely from a host digital processing system with the host digital system coupled to the backbone network through an intranetwork. The method may also include monitoring a performance parameter of the host digital processing system with the remote digital processing system.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Figure 2:
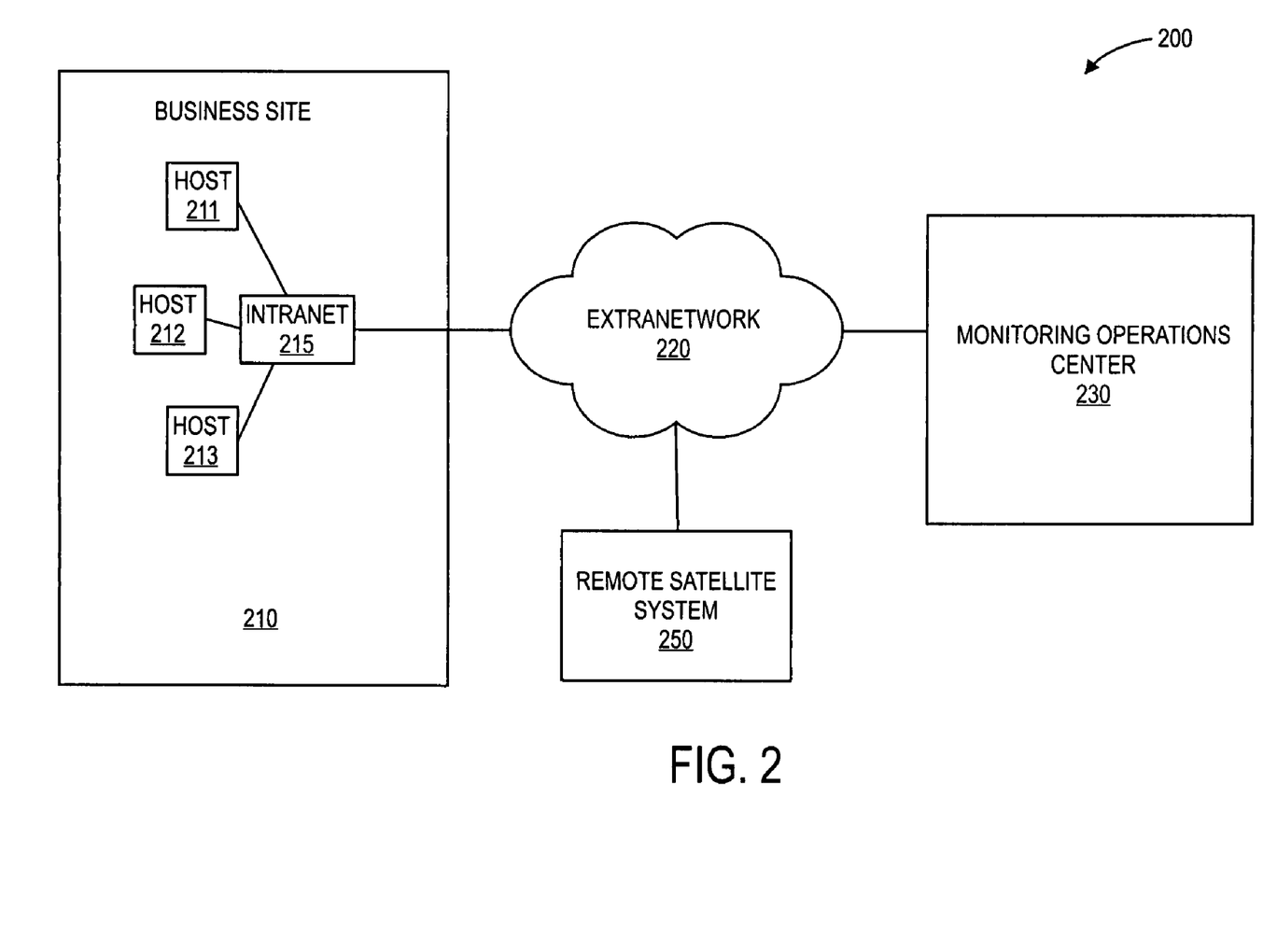
FIG. 2 illustrates one embodiment of a network site monitoring system.

FIG. 2 illustrates one embodiment of a network site monitoring system. The network monitoring system 200 may include various hardware and software components to perform monitoring functions. The network monitoring system 200 may include a business site 210, one or more remote satellite systems (e.g., remote satellite system 250) located remotely from business site 210, and a monitoring operations center (MOC) 230. Business site 210, remote satellite system 250 and MOC 230 may be coupled together via extranetwork 220, such as an Internet Protocol (IP) network.

An IP network transmits data in the form of packets that include an address specifying the destination systems for which communication is intended. Business site 210, remote satellite system 250, and MOC 230 may communicate with each other using various protocols, for examples, HTTP, Telnet, NNTP, and FTP. Security layers for managing the security of data transmission may also reside between the application protocols and the lower protocol (TCP/IP) layers, for examples: Secure Sockets Layers (SSL). Alternatively, secure application protocols may be used, for examples, Secure HTTP (HTTPS) and Secure Shell (SSH). These various protocols are known in the art; accordingly, a detailed discussion is not provided herein.

In one embodiment, MOC 230 may be located remotely from business site 210. Alternatively, MOC 230 may be located locally to or within business site 210. It should be noted that local and remote designations do not necessarily refer to geographic relationships but, rather, to network relationships.

Business site 210 may include one or more computer systems, or hosts, (e.g., hosts 211–213) connected together via intranetwork 215. Three hosts 211–213 are shown only for illustrative purposes. Business site 210 may have more or less than three hosts. Hosts 211–213 may be configured to perform as servers. In one embodiment, intranetwork 215 is a local area network (LAN). The local area network may be either a wired or wireless network. Alternatively, hosts 211–213 may be coupled together using other types of networks, for example, a metropolitan areas network (MAN) or a wide area network (WAN) with various topologies and transmission mediums.

A host (e.g., host 211) may be configured to provide various services for clients that are accessed through ports of the host connected to intranetwork 215. Types of network services include, for examples, electronic mail using a Simple Mail Transfer Protocol (SMTP), web page display using HTTP, news article distribution using a Network News Transfer Protocol (NNTP), fetching email from a remote mailbox using a Post Office Protocol-3 (POP3), and text file retrieval for viewer displaying using Gopher, etc. Each service may be configured on an industry standard port or on a custom port. If a service operates with a custom port, then remote satellite system 250 may either be preprogrammed with the port information or perform probes to determine a port's configuration.

For example, if host 211 is configured to operate as an HTTP server, remote satellite system 250 may attempt to establish a connection to industry standard TCP port 80 (or port 443 if HTTPS is used) to determine if it is connected to intranetwork 215. If no reply is received, then port 80 for that particular host 211 is either down or host 211 may be using a different port for the service.

Figure 3:
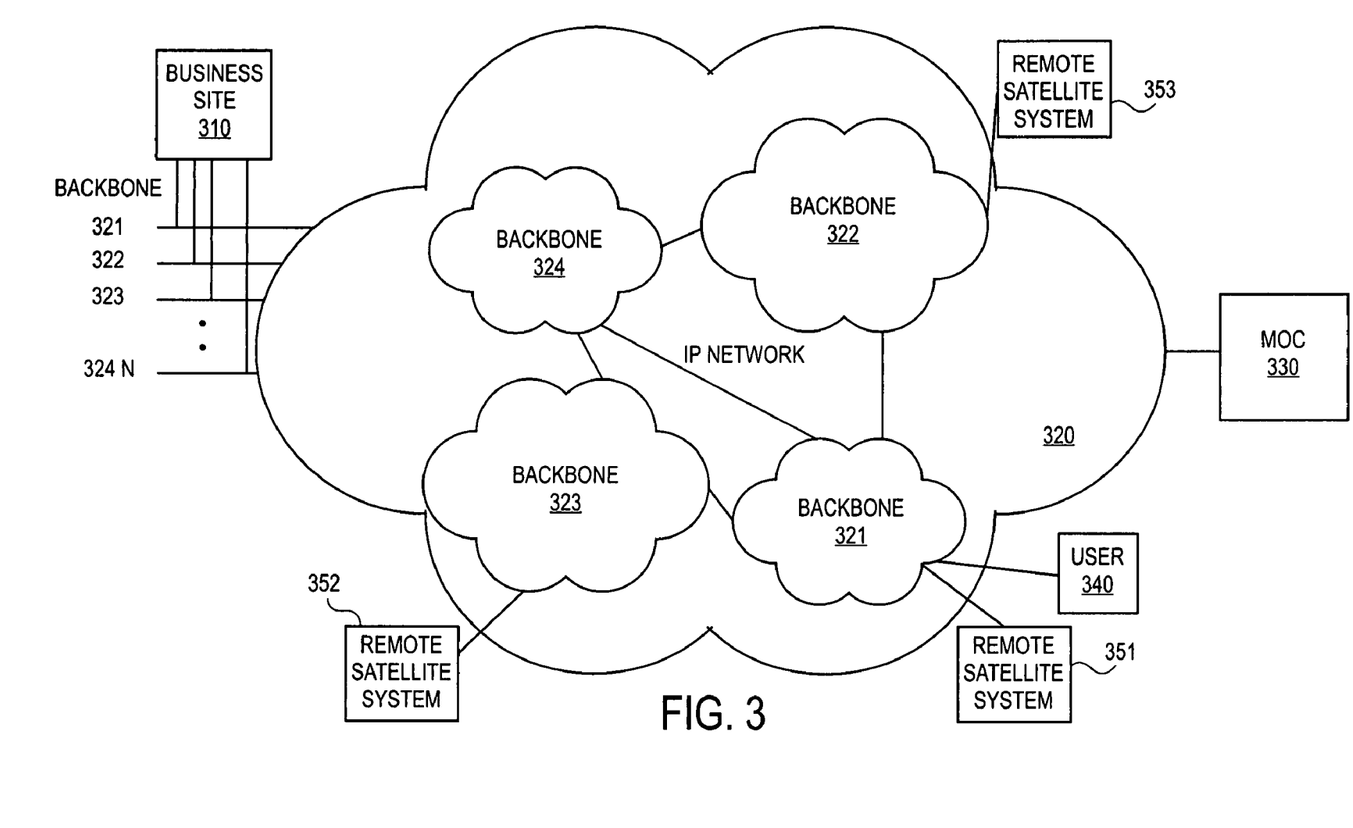
FIG. 3 illustrates one embodiment of remote satellite systems coupled to an IP network.

FIG. 3 illustrates one embodiment of remote satellite systems coupled to an IP network. In one embodiment, one or more remote satellite systems (e.g., remote satellite systems 351–353) may be strategically positioned at different points on IP network 320 that are close to network backbones 321–324. Four network backbones are shown only for illustrative purposes. The network site monitoring system may include more or less than four backbones. Backbones are extranetworks that enable high-bandwidth communication, in particular long distance communication, between short range networks (e.g., local and regional area networks). Examples of backbones 321–324 include those provided by Sprint, AT&T, Exodus, and UUNET.

Remote satellite systems 351–353 are positioned at points similar to those of expected users (e.g, user 340) of business site 310. In one embodiment, remote satellite systems 351–353 may be positioned behind peering points between backbones. In another embodiment, remote satellite systems 351–353 may be positioned at geographically significant locations (e.g., countries, states, and cities from which users access network 320) or network-topographically significant locations (e.g., close to and far from business site's 310 server). Other strategies may be used to position remote satellite systems 351–353. For example, in another embodiment, remote satellite systems 351–353 may be positioned behind major Internet Service Provider (ISP) proxy servers or behind access points for the business users (e.g., large dial-up pools such as America On Line and Earthlink, cable ISP providers, DSL providers, ISDN providers, etc.)

Remote satellite systems 351–353 may operate similar to a client system to interact with hosts of business site 310 in order to monitor and evaluate user interactions with the business site 310 hosts (i.e., the experience that a user of the business site will undergo). It should be noted that the remote satellite systems 351–353 are not limited to directly accessing a host but may also access a host through another system such as a proxy server.

Business site 310 may designate the URLs of one or more web pages to monitor and evaluate. In one embodiment, a business site may be able to pre-set cookies in the monitoring configuration to allow remote satellites 351–353 to access particular web pages. In general, a business site may serve information both in a stateless way (e.g., the corporate info page, a static page that is served up the same way to every visitor on each visit) and in a stateful way (e.g., a user's account info page, where the information may change between users and between each visit of the same user, and where the system must first know some state before serving up information, particularly some user-identifying state information like a username).

In one embodiment, to get the stateful information, a user usually goes through a fixed flow. For example, to get to an "Account Information" page, a user may first have to go through a "Login" page, then to a "Select Account" page. At each stage, the server must know where the user is in the process. That information may be maintained with cookies that are small portions of data stored on the client machine that are sent to the server with information requests. Typically an unattended agent exercises this flow. The agent runs a monitoring script that posts authentication data, accepts the cookie, posts the account number, and then examines the final page. However, if the "Login" page is down, the other two pages may not be monitored. As such, by pre-setting a cookie with required state information, an unattended agent may verify the performance of each page independent of the other pages.

Referring still to FIG. 3, a web page may be configured to perform a particular type of transaction, for example, a purchase transaction. These URL addresses may be downloaded to remote satellite systems 351–353 or programmed directly into remote satellite systems 351–353. The remote satellite systems 351–353 establish connections with the designated URL to perform transactions and report on the various system parameters and backbone conditions such as transaction times (e.g., connection time, download times, etc.) as discussed below. Because remote satellite systems 351–353 are connected to backbones 321–324 at points similar to that of a business site's 310 users (e.g., user 340), remote satellite systems 351–353 may provide data relevant to the experience that similarly connected users experience. The remote satellite systems 351–353 collect this data for analysis and report generation.

In one embodiment, the data is analyzed and a report is generated by the remote satellite systems 351–353 and transmitted to MOC 330, with the data also being transmitted if desired. Alternatively, the data may be transmitted to MOC 330 with the analysis and report being generated at MOC 330. The information on remote satellite systems 351–353 may either be pushed or pulled across IP network 320 to MOC 330 for processing such as evaluation, notification, and reporting. The MOC 330 may then take corrective actions including notifying the business site of identified problems; rerouting network traffic; and/or contacting a backbone provider directly to fix problems. For example, if the access time monitored by remote satellite system 353 on backbone 322 is long relative to the time on backbones 321, 323, and 324, then traffic may be rerouted to the other backbones until the data collected by remote satellite system 353 indicates that the problem has been fixed.

Figure 4:
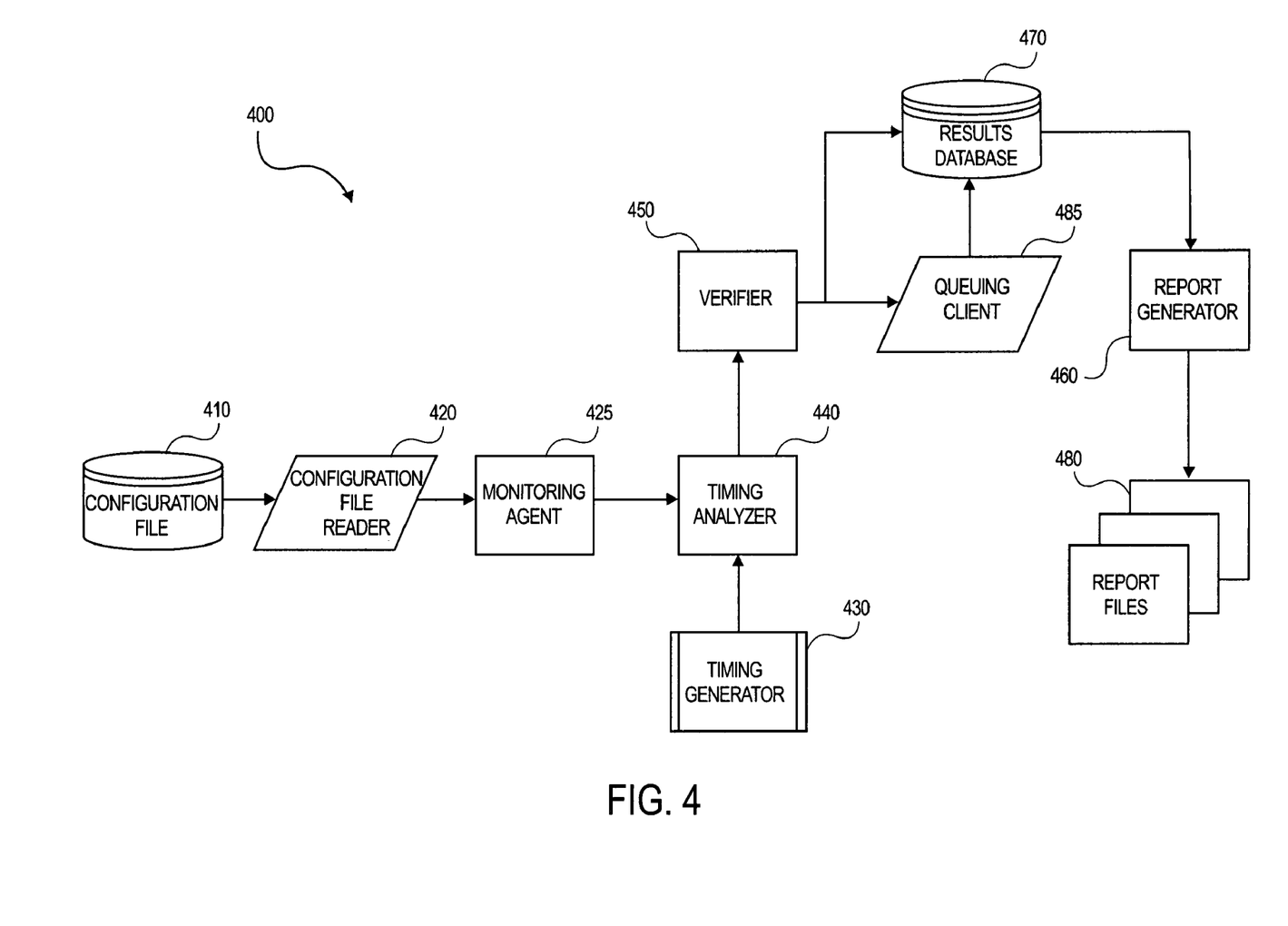
FIG. 4 is a block diagram illustrating an exemplary architecture of a remote satellite monitoring system.

FIG. 4 is a block diagram illustrating an exemplary architecture of a remote satellite monitoring system. In one embodiment, remote satellite monitoring system 400 may include a configuration file or database 410 for storing parameters for the different business sites that are monitored. The parameters provide a remote satellite system with the information needed to monitor a host, for examples, URLs to monitor, thresholds to alert on, authentication information for password-protected pages, data to upload, pre-defined cookies, and positive/negative search patterns, as discussed below.

In one embodiment, the information stored in configuration file 410 is provided to configuration file reader 420 that reads the information from configuration file 410 and provides it to monitoring agent 425. In an alternative embodiment, monitoring agent 425 may read the configuration database directly.

Once monitoring agent 425 has the configuration information, one or more of the following operations may be performed for each configured transaction. In one embodiment, timing analyzer 440 may be used to measure timing threshold parameters. Timing threshold parameters may include, for examples, domain name system (DNS) lookup time, connect time, latency, transfer rate, and throughput. Timing generator 430 is used to generate the timing signals required to measure the timing threshold parameters.

In the addressing scheme of an IP network, an address comprises four number strings separated by dots. Each computer system on the network has a unique address. For ease of use, names in the form of alphanumeric characters (e.g., recognizable words) may be mapped to a number string. The DNS is a hierarchical naming scheme and distributed database system for implementing a naming scheme for mapping computer system names to IP addresses. The DNS lookup time is the time it takes for a client system's browser (in this case the remote satellite system) to connect with a DNS database to translate the business site web page server's name (e.g., www.nocpulse.com) into an IP address, before sending a request to the business site server. As such, connection agent 425 is used to establish a connection with a DNS database for a designated URL and then, subsequently, establish a connection with the designated URL.

Once a connection with a particular URL is established, timing analyzer 1440 is used to record detailed timing statistics of a transaction. During the transaction, the connect time, latency, transfer rate, and throughput parameters may be measured. The connect time is the time it takes for a client system to send a request to establish a connection with a business server and receive a reply from the business server that a connection is established.

Additional timing parameters such as latency may also be measured. Latency is the time between a client sending in a request for data and getting back the first byte of data. For example, for a credit card transaction, a user sends in data about his credit card (e.g., account name, credit card number, expiration date, etc.) and the items that he wishes to purchase to the business site. The business site may then contact the credit card company, where some back-end processing is performed, to verify the user's credit. Only after this is complete will the business site transmit a confirmation to the user that the purchase transaction is complete. In this example, the request for data may be the request for acknowledgement of a completed transaction and the data sent back to the user is confirmation that the transaction has been successfully completed. As such, the transaction generator 440 performs steps similar to those that a user would perform to complete a desired transaction (e.g., a credit card transaction).

The transfer rate is the network rate, or the bytes per second between the first byte and last byte of a particular response. Throughput is the time it takes (e.g., in bytes per second) for an entire session from DNS lookup to the last byte received by a client.

The remote satellite system may also evaluate correctness parameters of the network connection to the business site using verifier 450. Verifier 450 may be part of a host program, a separate program on a remote satellite system, or a separate program on another system. Verifier 450 may include one or more verifiers to evaluate correctness parameters. For example, verifier 450 may include a content verifier, a subsidiary page (SUBS) verifier, and link verifier.

The content verifier verifies the data according to the configuration, for examples, the size of the content, the format (HTML vs. XML vs. GIF, etc.), and whether the content contains the correct information. Verifying the correctness of content may be performed by determining positive or negative search patterns on a particular web page. Search patterns may be literal strings such as ordered groups of characters (e.g., partial words, words, and phrases with or without spacing and punctuation) or regular expressions such as patterns of characters (e.g., one or more digits followed by a pound sign). Positive search patterns are patterns that must be found in the content for the content to be considered correct. Negative search patterns are patterns that must not be found in the content for the content to be considered correct.

In one embodiment, the content may be passed off to a SUBS verifier which parses the content for subsidiary pages and tries to retrieve each subsidiary page. A subsidiary page contains data that is attached to a parent web page. As previously discussed, a web page may contain links to special accessory files (e.g., images, frames, background sounds, applets, etc.) that are automatically loaded by a client's browser in addition to the text. When a client's browser loads a web page that contains an image, for example, at least two transactions may be performed: an HTML transaction that loads the text of the web page and fetch transaction that retrieves the image file from its storage location. As such, evaluating the correctness of such a subsidiary page involves determining whether the content of the subsidiary page is available for retrieval.

In one embodiment, the content may be passed off to a links verifier. A web page may also contain links (i.e., strings of text containing IP addresses of other web pages) that a user can access by, for example, selecting the link with a cursor control device. The links verifier parses the content for links (e.g., HTML Anchor tags and hypertexts links) and makes a determination as to whether the content on a link is accessible.

The output of verifier 450 is provided to queuing client 485 to store and queue collected data such as performance metrics (e.g., timing parameter statistics and correctness parameter checks) and alerts. Queuing client 485 may periodically transmit the collected data to results database 470 and/or a notification system such as MOC 230 of FIG. 2. The remote satellite monitoring system 400 may also include multiple queues for different types of data, for example, one queue for correctness parameters and one for timing parameters. A priority may be set for each of the queuing clients that determines the order in which data will be uploaded.

The performance metrics may be provided to results database 470 either directly via queuing client 460 or by way of another interface where they are made available to report generator 460. Report generator 460 generates a report file 480 that contains information about the performance metrics. Reports generator 460 may generate reports automatically or on demand. A report may be, for example, a graph of the connect time over the previous three hours. In an alternative embodiment, the data collected by remote monitoring system 400 may be transmitted to a MOC, with the MOC performing report generation.

It should be noted that although the monitoring and evaluating of a business site has been discussed at times in relation to an HTML protocol, systems operating with other types of protocols, for examples, FTP and Gopher may also be monitored and evaluated.

Figure 5:
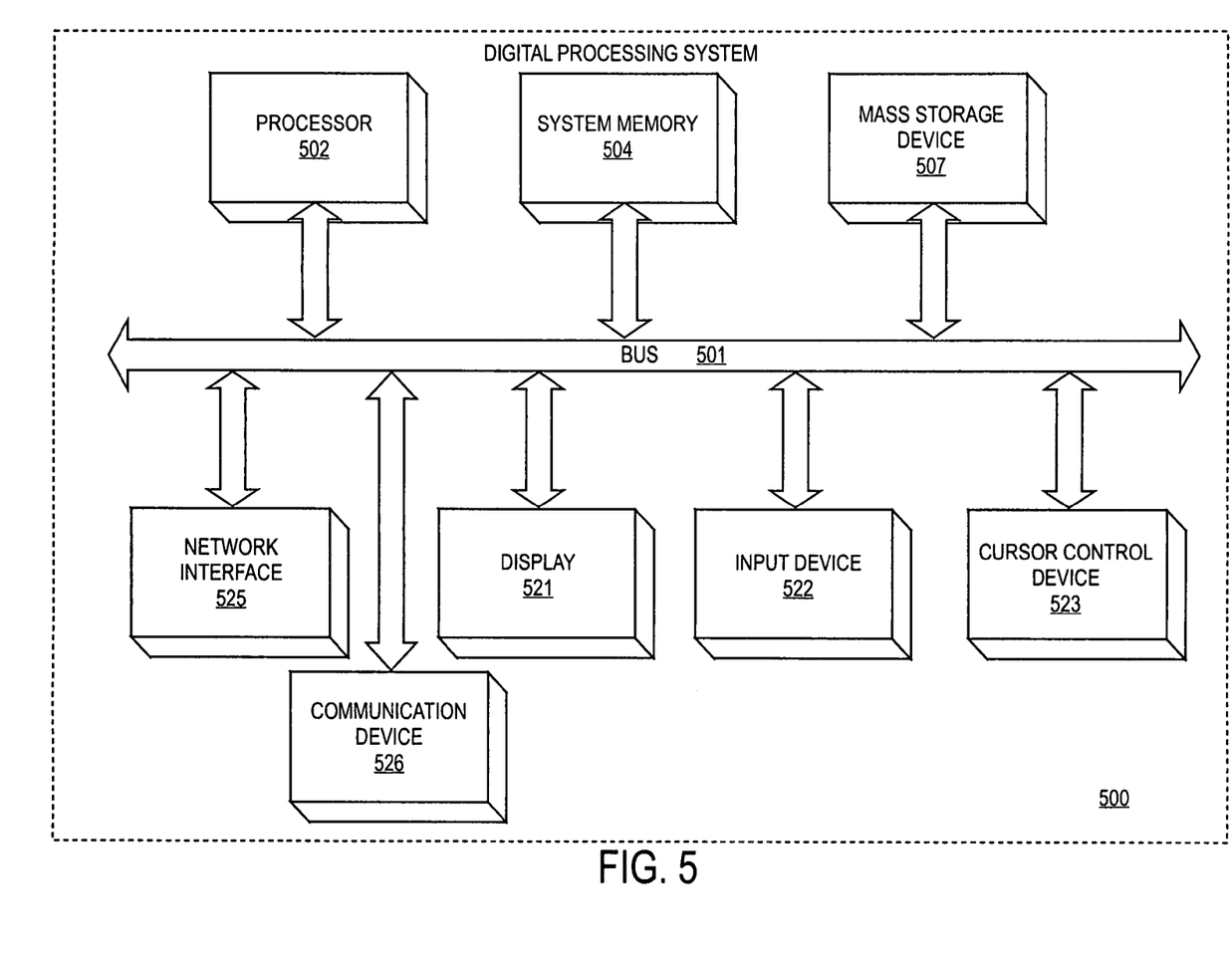
FIG. 5 illustrates one embodiment of a remote satellite system in the form of a digital processing system.

FIG. 5 illustrates one embodiment of a remote satellite system in the form of a digital processing system 500 representing an exemplary workstation, personal computer, server, etc., in which features of the present invention may be implemented.

Digital processing system 500 includes a bus or other communication means 501 for communicating information, and a processing means such as processor 502 coupled with bus 501 for processing information. Processor 502 may represent one or more processors such as a Motorola PowerPC processor or an Intel Pentium processor, etc. Digital processing system 500 further includes system memory 504 that may include a random access memory (RAM), or other dynamic storage device, coupled to bus 501 for storing information and instructions to be executed by processor 502. System memory 504 also may be used for storing temporary variables or other intermediate information during execution of instructions by processor 502. System memory 504 may also include a read only memory (ROM) and/or other static storage device coupled to bus 501 for storing static information and instructions for processor 502.

A data storage device 507 such as a magnetic disk or optical disc and its corresponding drive may also be coupled to digital processing system 500 for storing information and instructions. The data storage device 507 may be used to store instructions for performing the steps discussed herein. Processor 502 may be configured to execute the instructions for performing the steps discussed herein. In one embodiment, digital processing system 500 is configured to operate with a LINUX operating system stored on data storage device 507. In alternative embodiments, another operating system may be used, for examples, Windows NT and Solaris.

In one embodiment, digital processing system 500 may also be coupled via bus 501 to a display device 521, such as a cathode ray tube (CRT) or Liquid Crystal Display (LCD), for displaying information to the user. For example, graphical and/or textual depictions/indications of system performance characteristics, and other data types and information may be presented to the system administrator on the display device 521. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A network interface device 525 is also coupled to bus 501. Depending upon the particular design environment implementation, the network interface device 525 may be an Ethernet card, token ring card, or other types of interfaces for providing a communication link to a backbone of an IP network for which digital processing system 500 is monitoring.

It will be appreciated that the digital processing system 500 represents only one example of a system, which may have many different configurations and architectures, and which may be employed with the present invention. For example, some systems often have multiple buses, such as a peripheral bus, a dedicated cache bus, etc.

Figure 6:
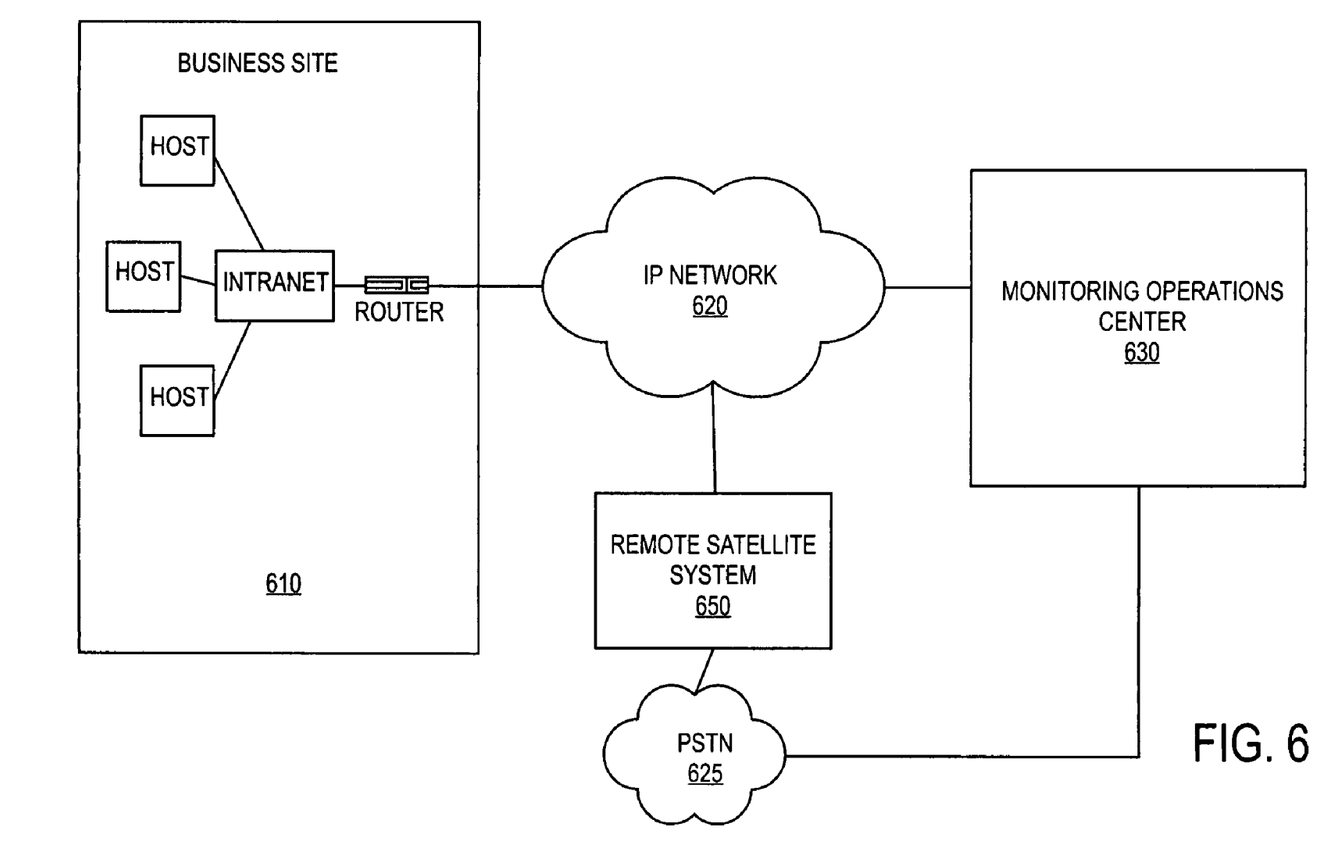
FIG. 6 illustrates an alternative embodiment of a network site monitoring system.

In one embodiment, communication device 526 may also be coupled to bus 501. The communication device 526 may be a modem, or other well-known interface device, for providing a communication link to the MOC independent of the communication link to which network interface 525 is connected. In this manner, communication device 526 provides a backup link to a MOC if the primary link fails as illustrated by FIG. 6. For example, remote satellite system 650 may include a modem to enable communication via the Public Switched Telephone Network (PSTN) 625 with MOC 630 independent of the communication link through IP network 620. In an alternative embodiment, other communication means (e.g., wireless) may be used to enable remote satellite system 650 communication with MOC 630 independent of IP network 620. MOC 630 may include one or more digital processing systems similar to digital processing system 500 of FIG. 5.

Figure 7A:
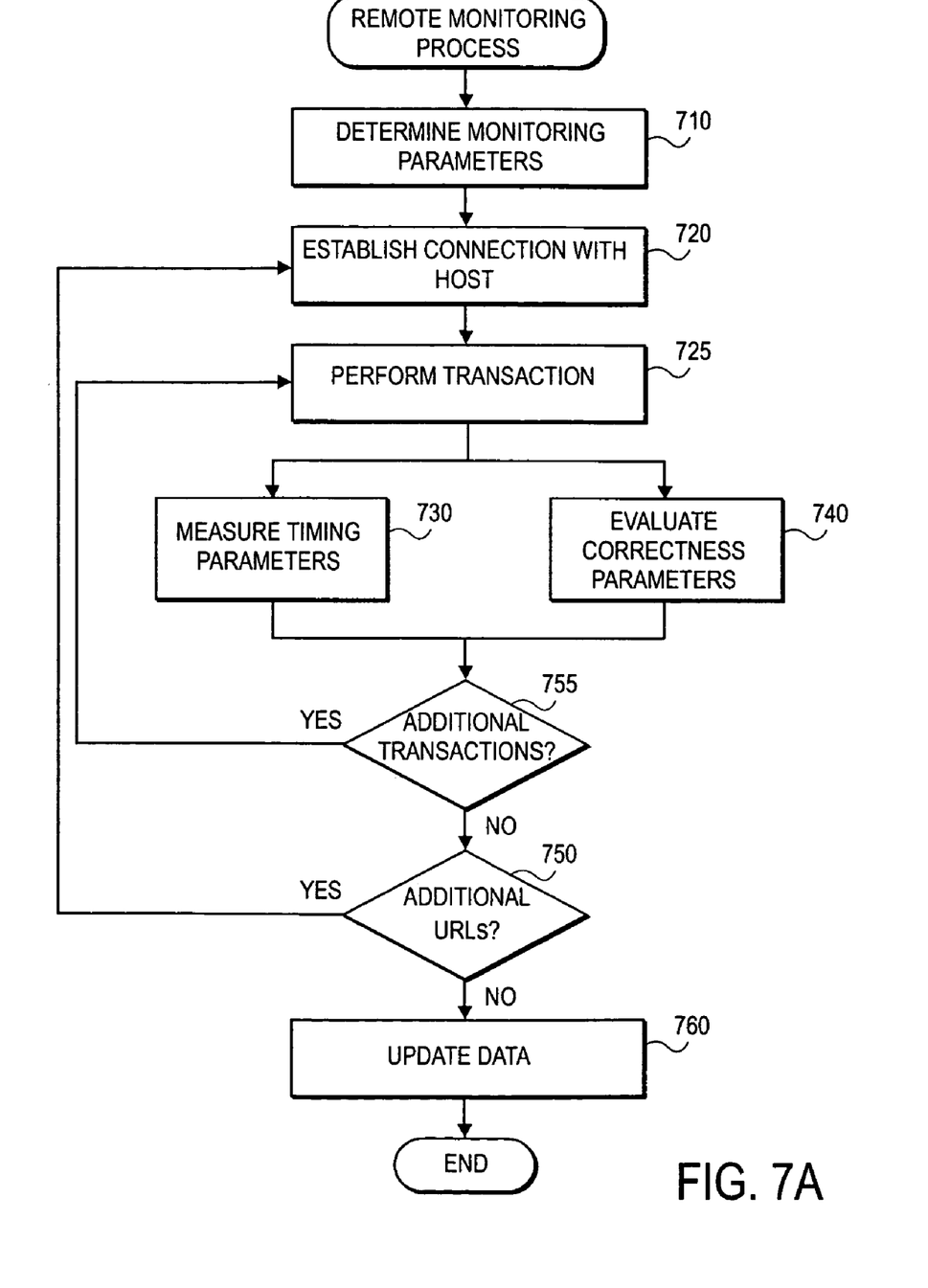
FIG. 7A illustrates one embodiment of a method of remote monitoring.

FIG. 7A illustrates one embodiment of a method of remote monitoring. The method may include determining parameters to monitor, step 710. In one embodiment, the parameters may be configured by the business site through a configuration interface at the MOC and then downloaded by the MOC to one or more of the remote satellite systems. Alternatively, the configuration interface may reside at a remote satellite system.

Figure 7B:
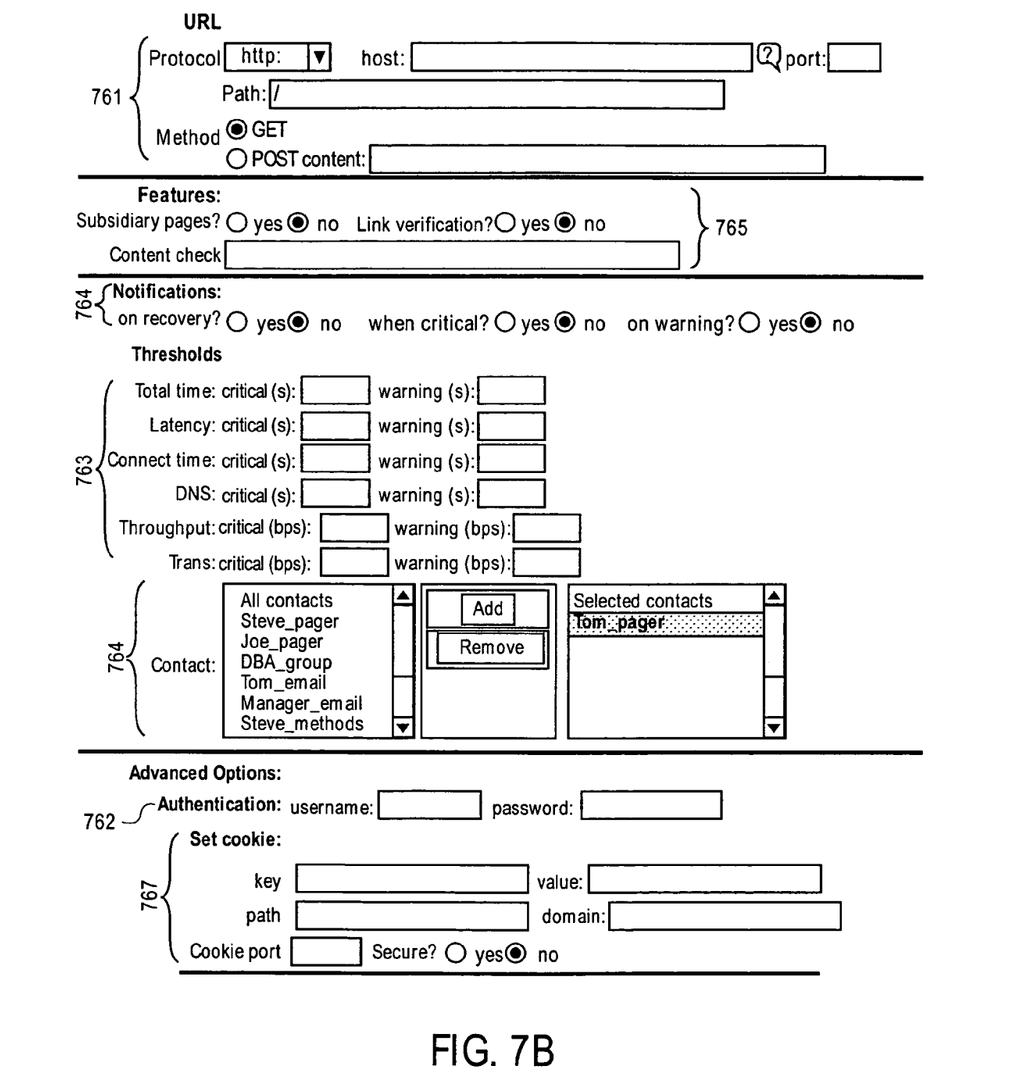
FIG. 7B illustrates one embodiment of a configuration interface.

FIG. 7B illustrates one embodiment of a configuration interface 760. The parameters may include for examples, the URL (the location of the desired information, including protocol, server, port, path, and optionally additional data) 761, authentication information 762, timing thresholds 763, notification configuration 764, features (e.g., check links) 765, pre-set cookie 767. In an alternative embodiment, these parameters may be supplied by a business site through other means and configured by the MOC, or determined by the MOC as discussed above.

Referring again to FIG. 7A, a connection with a particular host (e.g., a URL address) is attempted, step 720, so that a transaction may be performed, step 725. In one embodiment, one or more timing parameters are measured, step 730. In an alternative embodiment, one or more correctness parameters may be evaluated, step 740. A determination is made if there are additional transactions, step 755, and additional URLs are to be analyzed, step 750. If so, then steps 720–740 may be repeated. Once one or more URLs are analyzed, the collected parameter data is analyzed and the data is uploaded, step 760.

Figure 8:
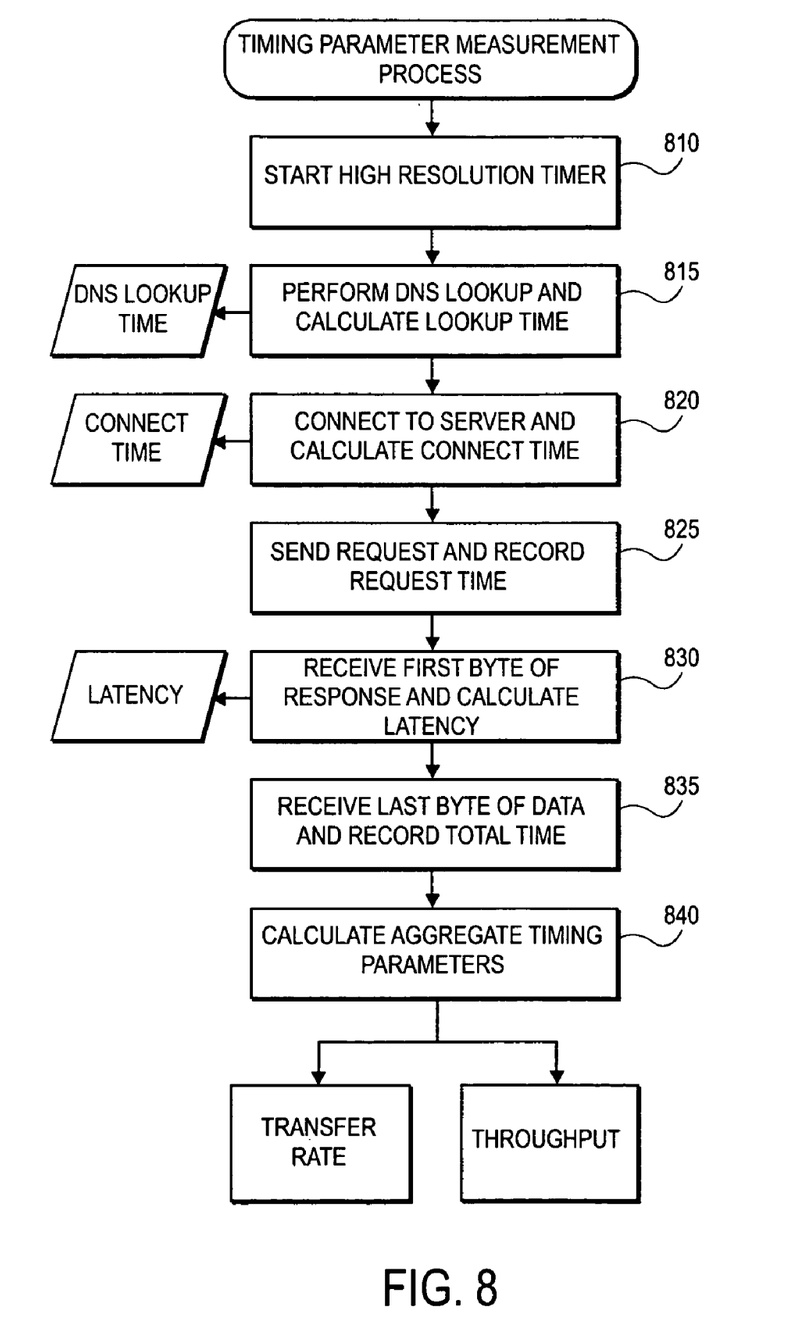
FIG. 8 illustrates one embodiment of a timing parameters measurement process.

FIG. 8 illustrates one embodiment of a timing parameter measurement process. In one embodiment, a high resolution timer is started, step 810. Next, a DNS lookup may be performed and the lookup time calculated, step 815. After DNS lookup is complete, a connection with a particular URL address of a host system is established and the connect time calculated, step 820. Time may be calculated with either direct or relative timing measurements.

The transaction request may be performed and the time of request recorded, step 825. Receipt of the first byte of the response is waited for and the latency calculated, step 830. When the last byte of data is received, the total time is recorded, step 835. The calculation of aggregate timing parameters may be performed, step 840, including data transfer rate and throughput.

Figure 9:
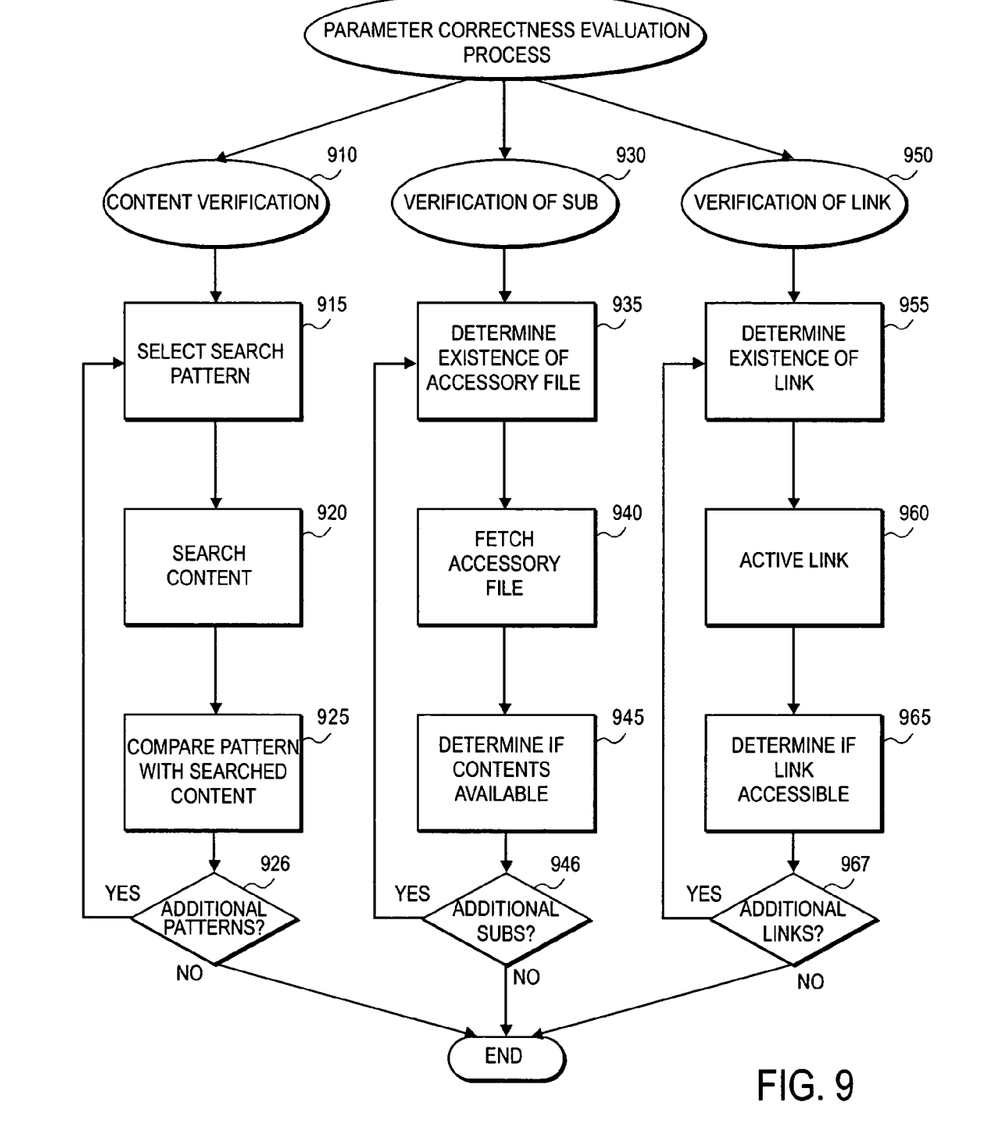
FIG. 9 illustrates one embodiment of a parameters correctness verification process.

FIG. 9 illustrates one embodiment of a parameters correctness verification process. In one embodiment, the parameter correctness verification process may include one or more of the following: verification of search strings 910; verification of SUBS 930; and verification of links 950.

Content verification 910 may include selecting a positive search pattern or a negative search pattern, step 915; searching the content, step 920; and comparing the pattern with the searched content, step 925. In one embodiment, search patterns may be simple strings (i.e., ordered groups of characters), and step 925 may include determining if the search string occurs anywhere in the content. In another embodiment, search patterns may be regular expressions (e.g., three digits followed by a pound sign) and step 925 may include determining if any group of characters in the content satisfy the expression. The content is successfully verified if the pattern is a positive pattern and the pattern matches, or the pattern is a negative pattern and the pattern does not match. If there is additional content to be verified, step 926, the process may be repeated.

Verification of SUBS 930 may include determining the existence of accessory files, step 935. The accessory files are fetched, step 940, and then examined to determine if the content of these files is available, step 945. For example, a web page may contain a link to an image file that is automatically loaded by a client's browser in addition to the text. As such, a fetch transaction may be performed to retrieves the image file from its storage location. If no image is retrieved then a determination may be made the content of the image file is not available for retrieval. The process may be recursive. For example, if page A contains subsidiary page B, and subsidiary page B contains its own subsidiary page C, then both B and C (and sub-subsidiary pages) are verified. If there are additional subsidiary pages to be verified, step 946, the process may be repeated.

Verification of links 950 may include determining the existence of a link, step 955, and following the link, step 960. Next, a determination may be made as to whether the link is accessible, step 965. In one embodiment, accessibility may include downloading the linked data and possibly doing one or more content checks (e.g., verify that the returned page is not empty). In another embodiment, following the link may include query the linked server to see if the linked data is available, but without actually downloading the data. Either embodiment, may be implemented by the link verifier directly, or the link verifier may drive an external program (e.g., monitoring client 431 of FIG. 4). The process may be repeated for additional links, step 967.

In one embodiment, the method and architecture discussed above may be implemented with an interpreter program. An interpreter is a language processor that analyzes a program and then carries out the specified actions (processes instructions) at the time of execution, rather than producing a machine-code translation to be executed later (as with a compiler). In one embodiment, the steps discussed above are coded using Perl. In an alternative embodiment, other programming languages may be used.

The method and apparatus for remote monitoring of a business site as described above may provide valuable information about the business site. By positioning the remote satellite systems at points near backbones approximate to those of clients accessing a business site, a more accurate analysis of a site's performance may be performed that better reflects an end user's true experience. In addition, by using dedicated remote satellite systems, consistent information about the performance of a business site may be collected independent of variations in an end user's client system hardware and software. Moreover, by measuring various timing threshold parameters and evaluating correctness parameters of the network connection to the customer site, a more detailed analysis of a site's performance may be performed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a host digital processing system to couple to an intranetwork, the intranetwork to couple to an extranetwork; and
a first remote digital processing system coupled to the extranetwork to monitor a data transfer rate between the host digital processing system and the remote digital processing system, the remote digital processing system coupled to the extranetwork at a first location similar to that of a first expected user of the first host digital processing system, wherein the the data transfer rate is a transfer rate of bytes between a first byte and a last byte of a response.

2. A system, comprising:
a first host digital processing system to couple to an intranetwork, the first intranetwork to couple to an extranetwork; and
a first remote digital processing system coupled to the extranetwork to monitor a performance parameter associated with the first host digital processing system, the first remote digital processing system coupled to the extranetwork at a first location similar to that of a first expected user of the first host digital processing system, wherein the performance parameter is a latency time between a request for data and receiving a first byte of data from the first host digital processing system.

3. The system of claim 2, wherein the extranetwork comprises a first backbone network and wherein the first remote digital processing system couples to the first backbone network.

4. The system of claim 2, further comprising a second remote digital processing system to monitor a performance parameter of the first host digital processing system, wherein the extranetwork further comprises a second backbone network and wherein the second remote digital processing system couples to the second backbone network at a second location similar to that of a second expected user of the first host digital processing system.

5. The system of claim 4, wherein the second extranetwork is a public switched telephone network.

6. The system of claim 4, wherein the second extranetwork is a wireless network.

7. The system of claim 2, further comprising a monitoring operations center coupled to the extranetwork, the monitoring operations center to receive data from the first remote digital processing system.

8. The system of claim 2, wherein the first remote digital processing system is configured to store cookies that are pre-set on the host digital processing system.

9. The system of claim 8, wherein the host digital processing system includes a plurality of web pages and wherein the pre-set cookies enable the first remote digital processing system to access a particular one of the plurality of web pages independent of another of the plurality of web pages.

10. A method of network monitoring, comprising:
positioning a remote digital processing system on a backbone network remotely from a host digital processing system, the remote digital processing system position approximate that of an expected user of the host digital processing system, the host digital system coupled to the backbone network through an intranetwork; and
monitoring one or more performance parameters including a latency time of the host digital processing system with the remote digital processing system, the monitoring comprising:
establishing a connection with the host digital processing system;
performing a transaction with the host digital processing system, wherein the latency time is associated with the transaction; and
calculating the latency time between a request for data and receiving a first byte of data.

11. The method of claim 10, further comprising transmitting information about the one or more performance parameters to a monitoring operations center.

12. The method of claim 10, wherein monitoring comprises:
determining the one or more performance parameters for monitoring;
establishing a connection with the host digital processing system; and
performing a transaction with the host digital processing system.

13. The method of claim 12, wherein determining comprises receiving the one or more performance parameters through a configuration interface.

14. The method of claim 12, wherein establishing comprises pre-setting cookies on the host digital processing system to enable the remote digital processing system to access data on the host digital processing system.

15. The method of claim 12, wherein the one or more performance parameters include a domain name server lookup time associated with establishing the connection.

16. The method of claim 10, wherein the one or more performance parameters includes a correctness parameter and wherein the method further comprises evaluating the correctness parameter.

17. The method of claim 16, wherein evaluating comprises:

determining a positive search pattern;
determining a negative search pattern; and
comparing the positive search pattern with the negative search pattern to verify the correctness of a content.

18. The method of claim 16, wherein evaluating comprises:
fetching an accessory file from a storage location; and
verifying that content of the accessory file is available for retrieval.

19. The method of claim 16, wherein evaluating comprises:
selecting a link on a web page; and
verifying that content corresponding to the web page is accessible.

20. The method of claim 10, further comprising:
pre-setting cookies on the host digital processing system; and
storing the pre-set cookies on the remote digital processing system.

21. A method of network monitoring, comprising:
positioning a remote digital processing system on a backbone network remotely from a host digital processing system, the remote digital processing system position approximate that of an expected user of the host digital processing system, the host digital system coupled to the backbone network through an intranetwork; and
monitoring a data transfer rate of the host digital processing system with the remote digital processing system, the monitoring comprising:
establishing a connection with the host digital processing system;
performing a transaction with the host digital processing system, wherein the data transfer rate is associated with the transaction; and
calculating the data transfer rate of bytes between a first byte and a last byte of a response.

* * * * *